US012601289B2

(12) United States Patent
Martschoke

(10) Patent No.: US 12,601,289 B2
(45) Date of Patent: Apr. 14, 2026

(54) HYDROGEN STORAGE POWER PLANT, AND METHOD FOR OPERATING SAME

(71) Applicant: EAG AUTOMATISIERUNGSBAU GMBH, Ohrdruf (DE)

(72) Inventor: Daniel Martschoke, Ohrdruf (DE)

(73) Assignee: EAG AUTOMATISIERUNGSBAU GMBH, Ohrdruf (DE)

( * ) Notice: Subject to any disclaimer, the term of this patent is extended or adjusted under 35 U.S.C. 154(b) by 0 days.

(21) Appl. No.: 18/856,612

(22) PCT Filed: Apr. 4, 2023

(86) PCT No.: PCT/EP2023/058830
§ 371 (c)(1),
(2) Date: Oct. 12, 2024

(87) PCT Pub. No.: WO2023/198526
PCT Pub. Date: Oct. 19, 2023

(65) Prior Publication Data
US 2025/0264050 A1 Aug. 21, 2025

(30) Foreign Application Priority Data
Apr. 13, 2022 (DE) ..................... 10 2022 203 737.5

(51) Int. Cl.
*F02B 43/10* (2006.01)
*F01N 5/02* (2006.01)
(Continued)

(52) U.S. Cl.
CPC ................ *F02B 43/10* (2013.01); *F01N 5/02* (2013.01); *F02B 43/12* (2013.01); *F02B 67/08* (2013.01);
(Continued)

(58) Field of Classification Search
CPC .......... F02B 43/10; F02B 43/12; F02B 67/08; F01N 5/02; F02M 21/0206; F02M 21/0221; F17C 5/00; F17C 7/00
See application file for complete search history.

(56) References Cited

U.S. PATENT DOCUMENTS

2002/0002827 A1* 1/2002 Viteri .................... F01K 25/005
60/617
2005/0198958 A1 9/2005 Haase
(Continued)

FOREIGN PATENT DOCUMENTS

DE 102019002500 A1 10/2020
DE 102019128882 B3 12/2020
(Continued)

OTHER PUBLICATIONS

International Search Report, mailing date Aug. 2, 2023 for corresponding International Application No. PCT/EP2023/058830 with English translation (7 pages).
(Continued)

*Primary Examiner* — Kyle Robert Thomas
(74) *Attorney, Agent, or Firm* — Intellectual Property Law Group LLP

(57) ABSTRACT

The invention relates to a hydrogen storage power plant (1) comprising:

in order to produce hydrogen ($H_2$) from methane or natural gas, a pyrolysis device for methane pyrolysis and/or natural gas pyrolysis and/or a plasmalysis device (6) for methane plasmalysis and/or natural gas plasmalysis; -a storage device (11), which is coupled on the output side to the pyrolysis device, for storing the hydrogen ($H_2$) or a storage device (11), which is coupled on the output side to the plasmalysis device (6), for storing the hydrogen ($H_2$); and (Continued)

a hydrogen combustion engine (12) which is coupled on the outlet side to the storage device (11) and has a closed noble gas circuit (12.1) for circulating noble gas, which noble gas circuit leads from an outlet channel (12.2) of the hydrogen combustion engine (12) via a circulation path to an inlet channel (12.3) of the hydrogen combustion engine (12) and guides a noble gas (EG) from the outlet channel (12.2) via the inlet channel (12.3) into a combustion chamber of the hydrogen combustion engine (12). The invention also relates to a method for operating such a hydrogen storage power plant (1).

11 Claims, 2 Drawing Sheets

(51) Int. Cl.

| | |
|---|---|
| ***F02B 43/12*** | (2006.01) |
| ***F02B 67/08*** | (2006.01) |
| ***F02M 21/02*** | (2006.01) |
| ***F17C 5/00*** | (2006.01) |
| ***F17C 7/00*** | (2006.01) |

(52) U.S. Cl.

CPC .... *F02M 21/0206* (2013.01); *F02M 21/0221* (2013.01); *F17C 5/00* (2013.01); *F17C 7/00* (2013.01); *F02B 2043/106* (2013.01); *F17C 2221/012* (2013.01); *F17C 2265/066* (2013.01)

(56) References Cited

U.S. PATENT DOCUMENTS

| | | | | |
|---|---|---|---|---|
| 2010/0236509 | A1* | 9/2010 | Mitani | F02D 19/027 123/1 A |
| 2014/0203557 | A1* | 7/2014 | Kim | F01K 23/101 60/39.12 |
| 2023/0264167 | A1* | 8/2023 | Hanke | B01J 19/088 429/411 |

FOREIGN PATENT DOCUMENTS

| | | | | |
|---|---|---|---|---|
| DE | 102020002276 | A1 | 10/2021 | |
| DE | 102020116950 | A1 * | 12/2021 | B01J 19/088 |
| WO | WO 2014/161531 | A2 | 10/2014 | |

OTHER PUBLICATIONS

Written Opinion of the ISA, dated Jul. 26, 2023 for corresponding International Application No. PCT/EP2023/058830 with English translation (8 pages).

German Office Action, mailing date Dec. 12, 2022 for corresponding German Application No. DE 10 2022 203 737.5 with English translation (9 pages).

* cited by examiner

HYDROGEN STORAGE POWER PLANT, AND METHOD FOR OPERATING SAME

CROSS-REFERENCE TO RELATED APPLICATIONS

This application is a U.S. National Phase application, under 35 U.S.C. § 371, of International Application no. PCT/EP2023/058830 with an international filing date of Apr. 4, 2023, and claims benefit of German Application no. 10 2022 203 737.5 filed on Apr. 13, 2022, each of which is hereby incorporated by reference for all purposes.

FIELD OF INVENTION

The invention relates to a hydrogen storage power plant.

The invention also relates to a method for operating such a hydrogen storage power plant.

BACKGROUND

Various energy-relevant devices and processes for the production of hydrogen are known in the art.

One such process for producing hydrogen is steam reforming. In this process, hydrocarbons such as methane and others are used as reducing agents for protons from water at high temperature and pressure. The resulting synthesis gas is a mixture of carbon monoxide and hydrogen. A quantitative ratio of the reaction products can then be improved in favor of hydrogen by means of the so-called water-gas shift reaction. However, this produces carbon dioxide and the efficiency is only 60% to 70%.

Another process for producing hydrogen is water electrolysis, in which water is broken down into hydrogen and oxygen in an electrochemical redox reaction by supplying electrical energy. This requires an energy input of approx. 45 kWh/kg of hydrogen.

The production of hydrogen by methane plasmalysis is also known. Plasmalysis is generally understood to be an electrochemical process in which a voltage source is required. Plasmalysis describes a plasma-chemical dissociation of organic and inorganic compounds in interaction with a thermal or non-thermal plasma between two electrodes. In methane plasmalysis, methane, for example from natural gas, is broken down into hydrogen and carbon in a plasma in the absence of oxygen. This requires an energy input of approx. 10 kWh/kg hydrogen. The purity of hydrogen produced using methane plasmalysis is approx. 98%.

DE 10 2020 116 950 A1 describes such a plasmalysis device intended for methane plasmalysis. The plasmalysis device is intended for corona discharge-induced splitting of hydrogen-containing gases into molecular hydrogen and a by-product and contains

- a gas-tight reaction chamber,
- a gas supply line for the hydrogen-containing gas into the reaction chamber,
- precisely one plasma electrode for generating corona discharges in the reaction chamber by means of a high-frequency alternating voltage and
- a gas outlet for molecular hydrogen from the reaction chamber.

The gas-tight reaction chamber is enclosed by a wall which is designed to electrically insulate the plasma electrode from an outer side of the wall. The plasma electrode is connected to a high-frequency generator for generating the high-frequency alternating voltage.

Pyrolysis of hydrocarbons, which can be purely thermal, is also known in the art.

Furthermore, various devices and processes for storing hydrogen are known in the art. The storage takes the form of compressed gas storage, liquefied gas storage, absorption storage, adsorption storage or storage of the hydrogen by means of a chemical bond between the hydrogen and another substance.

Furthermore, various devices for generating energy from hydrogen are known in the art. These include, for example, hydrogen-oxygen fuel cells and internal combustion engines.

For example, DE 10 2020 002 276 A1 describes a power generation system and a method for controlling the speed of a drive unit in a power generation system. The drive unit is a speed-controlled hydrogen engine with operating gas circulation. In order to regulate to the predetermined target speed, a change is made to an operating gas/oxygen/hydrogen mixture supplied to the hydrogen engine with operating gas circulation. Argon is used as the operating gas. Argon is circulated via an exhaust port of the hydrogen engine and via a circulation path to an inlet port and returned to the combustion chamber. This is a closed circuit, which realizes combustion without ambient air.

SUMMARY OF INVENTION

The object of the invention is to provide a novel hydrogen storage power plant and a novel method for operating a hydrogen storage power plant.

The object is achieved in accordance with the invention by a storage power plant and by a method according to the appended set of claims.

Advantageous embodiments of the invention are the subject of the subclaims.

The hydrogen storage power plant according to the invention has a pyrolysis device for methane pyrolysis or natural gas pyrolysis and/or a plasmalysis device for methane plasmalysis and/or natural gas plasmalysis for generating hydrogen from methane or natural gas. Furthermore, the hydrogen storage power plant has a storage device coupled on the output side to the pyrolysis device for storing the hydrogen or a storage device coupled on the output side to the plasmalysis device for storing the hydrogen. Furthermore, the hydrogen storage power plant has a hydrogen combustion engine coupled on the output side to the storage device with a closed noble gas cycle for a noble gas circulation, which leads from an exhaust port of the hydrogen combustion engine via a circulation path to an inlet port of the hydrogen combustion engine and guides a noble gas from the exhaust port via the inlet port into a combustion chamber of the hydrogen combustion engine.

The hydrogen produced in the pyrolysis and/or plasmalysis process in a particularly energy-efficient manner has a purity of approx. 98%. However, a hydrogen-oxygen fuel cell, which has a high efficiency, can only be operated with hydrogen of a higher purity. This means that the hydrogen must be purified before it can be used, which is very costly. A hydrogen combustion engine is characterized by a lower efficiency compared to a hydrogen-oxygen fuel cell, but can also be operated with hydrogen of lower purity.

The hydrogen combustion engine with a closed noble gas cycle used in the hydrogen storage power plant according to the invention, which is designed as an internal combustion engine, for example as a reciprocating piston engine or turbine, has a similarly high efficiency as a hydrogen-oxygen fuel cell, but can also be operated with hydrogen of low purity. This increase in efficiency results from the fact that the noble gas cycle is closed and realizes combustion of the hydrogen without ambient air. The use of the noble gas as a working gas or operating gas increases thermal efficiency compared to conventional internal combustion engines due to the high thermodynamic efficiency of the noble gas. The hydrogen combustion engine is also characterized by particularly low specific costs and a long service life, as well as high efficiency and zero emissions, especially compared to a hydrogen-oxygen fuel cell.

The present hydrogen storage power plant thus enables a combination of the energy-efficient pyrolysis and/or plasmalysis process for the production of hydrogen with a hydrogen combustion engine with a closed noble gas cycle in a particularly advantageous way and is characterized by a low required energy input with high efficiency at the same time. The electrical energy used on the input side, for example for plasmalysis, is lower than the electrical energy generated, for example, by an electrical generator coupled to the hydrogen combustion engine and driven by it.

The hydrogen storage power plant enables hydrogen to be produced and stored particularly efficiently from natural gas and/or methane when there is a surplus of electrical energy in an electrical grid, for example. In this process, elemental carbon is separated out instead of carbon dioxide. If, on the other hand, electrical energy is required, the hydrogen is also burned very efficiently in the hydrogen combustion engine and an electrical generator is driven by the hydrogen combustion engine, which feeds the generated electrical energy into the electrical grid.

The hydrogen storage power plant, similar to a pumped storage power plant, can be used to purchase electrical energy at a low price on an energy exchange when energy prices are low and to use this energy to generate and store the hydrogen. When energy prices are high, the stored hydrogen can then be burned in a reconversion process using the hydrogen combustion engine and the electrical energy generated can be sold at high prices and fed into the electricity grid. The hydrogen storage power plant is characterized by low-cost, high-capacity chemical energy storage and is particularly suitable for long-term storage.

In one possible embodiment of the hydrogen storage power plant, it comprises at least one electronic control unit which controls components of the hydrogen storage power plant, for example valves, pumps and other components.

In a further possible embodiment of the hydrogen storage power plant, an electrical energy storage device is provided in which electrical energy taken from the electrical grid is stored and made available to the pyrolysis device and/or plasmalysis device for its operation. This makes it possible to take electrical energy from the electrical grid at times when energy prices are low, to store it in the energy storage device and to supply the pyrolysis device and/or plasmalysis device with the stored, more cost-effective electrical energy at times when energy prices are high, so that the pyrolysis device and/or plasmalysis device have a particularly good utilization rate. In this way, the pyrolysis device and/or plasmalysis device can also be dimensioned smaller. If the stored hydrogen is to be burned for reconversion into electricity by means of the hydrogen combustion engine, this can be done in particular in such a way that the electrical energy generated is fed into the energy storage system when energy prices are low or medium and is fed from the energy storage system into the electrical grid when energy prices are high. The higher utilization of the pyrolysis device and/or plasmalysis device and the hydrogen combustion engine can result in a reduction in investment costs and the achievement of higher prices on the market, since periods of very high or very low prices are at least sometimes quite short.

In a further possible embodiment of the hydrogen storage power plant, the noble gas is argon. Argon is monoatomic and characterized by a particularly high thermodynamic efficiency, resulting in a further increase of the thermal efficiency of the hydrogen combustion engine.

In a further possible embodiment of the hydrogen storage power plant, it has an oxygen generation unit whose outlet is coupled to the inlet port of the hydrogen combustion engine. This allows oxygen to be supplied to the hydrogen combustion engine in high concentrations, which enables its operation and further increases its efficiency.

In a further possible embodiment of the hydrogen storage power plant, the oxygen generation unit is a gas permeation device which is designed to separate a gas mixture, in particular in the form of air, at least into oxygen and nitrogen. Such a gas permeation device comprises, for example, a gas permeation membrane and is particularly simple and reliable to operate.

In another possible embodiment of the hydrogen storage power plant, the gas permeation device is designed for cascaded separation of the gas mixture and separates nitrogen, oxygen and argon from the gas mixture. This allows oxygen and argon to be supplied to the inlet port of the hydrogen combustion engine and an argon reservoir can be reduced or omitted. To ensure that the argon concentration in the noble gas cycle does not rise above a predetermined limit value, excess argon is regularly removed so that impurities are regularly removed or "washed out" of the noble gas cycle.

In another possible embodiment of the hydrogen storage power plant, the pyrolysis device is designed in such a way that methane or natural gas is pyrolyzed without reducing the pressure. A pressure-resistant container is provided for this purpose, for example. Alternatively, the plasmalysis device is designed in such a way that methane or natural gas is pyrolyzed without reducing the pressure. This is achieved, for example, by adjusting an operating point, in particular by adjusting an electrical voltage, an electrical current, distances between electrodes, etc. The aforementioned designs of the pyrolysis device and/or the plasmalysis device enable methane and/or natural gas to be extracted directly from a gas network without prior pressure reduction. As a result, the effort required to compress the hydrogen produced to a higher pressure level, which is required to store it, can be reduced. This can further increase the efficiency of the hydrogen storage power plant.

In a further possible embodiment of the hydrogen storage power plant, it has a plasmalysis waste heat extraction point for extracting waste heat generated during methane plasmalysis and/or natural gas plasmalysis and/or a cooling circuit waste heat extraction point for extracting waste heat generated during the combustion of the hydrogen and transferred to a cooling circuit of the hydrogen combustion engine and/or an exhaust gas waste heat extraction point for extracting waste heat generated during the combustion of the hydrogen and transferred to a cooling circuit of the hydrogen combustion engine. waste heat extraction point for extracting waste heat generated during the combustion of the hydrogen and transferred to a cooling circuit of the hydrogen combustion engine from the cooling circuit and/or an exhaust gas waste heat extraction point for extracting waste heat generated during the combustion of the hydrogen and transferred to an exhaust gas of the hydrogen combustion engine from the exhaust gas. This means that both the hydrogen combustion engine and the plasmalysis or pyrolysis provide high-temperature waste heat of approx. 400° C., for example. The waste heat extraction points make it possible to sort the waste heat according to its temperature and thus optimize the use and/or storage of the waste heat in the hydrogen storage power plant and/or applications outside the power plant.

In a further possible embodiment of the hydrogen storage power plant, the plasmalysis waste heat extraction point and/or the exhaust gas waste heat extraction point are/is coupled as a heat source to a thermodynamic cycle process, for example a (water) steam process, an organic Rankine process or a supercritical $CO_2$ process, and the thermodynamic cycle process is coupled to a generator for generating electrical energy. The electrical energy generated in this process can in turn be fed to applications within the hydrogen storage power plant, for example the plasmalysis device and/or a compressor for compressing the hydrogen to store it, thus further increasing its efficiency. The electrical energy generated can also be fed to applications outside the hydrogen storage power plant.

In a further possible embodiment of the hydrogen storage power plant, a switching element is coupled to the plasmalysis waste heat extraction point, the exhaust gas waste heat extraction point and the thermodynamic cycle process via a medium, wherein the switching element is designed to couple the plasmalysis waste heat extraction point and the exhaust gas waste heat extraction point separately and together with the thermodynamic cycle process via the medium. In a particularly advantageous manner, the switching element enables at least virtually uninterrupted operation of the thermodynamic cycle, although high-temperature waste heat is not generated at the plasmalysis waste heat extraction point and the exhaust gas waste heat extraction point at the same time due to the temporally different operation of the plasmalysis device and hydrogen combustion engine.

In a further possible embodiment of the hydrogen storage power plant, the switching element is additionally coupled to a heat storage device via the medium, whereby the switching element is designed to couple the plasmalysis waste heat extraction point and the exhaust gas waste heat extraction point separately and together with the heat storage device via the medium. Furthermore, the switching element is designed to couple the heat storage device with the thermodynamic cycle via the medium. The heat storage device makes it possible to store the high-temperature waste heat from the plasmalysis device and the exhaust gas from the hydrogen combustion engine, so that interruptions can be buffered and the thermodynamic cycle can be carried out without interruption, particularly if there is no waste heat at the plasmalysis waste heat extraction point and the exhaust gas waste heat extraction point or if there is only an insufficient amount of waste heat.

In a further possible embodiment of the hydrogen storage power plant, the heat storage device has at least one latent high-temperature storage unit with at least one phase change material and/or at least one sensitive high-temperature storage unit with at least one sensitive storage material, for example a storage rock.

In the method according to the invention for operating an aforementioned hydrogen storage power plant, methane pyrolysis or natural gas pyrolysis and/or methane plasmalysis and/or natural gas plasmalysis are/is carried out to generate hydrogen from methane or natural gas. The hydrogen produced is stored. The stored hydrogen is combusted in a hydrogen combustion engine with a closed noble gas cycle to a noble gas circulation, which leads from an exhaust port of the hydrogen combustion engine via a circulation path to an inlet port of the hydrogen combustion engine and guides a noble gas from the exhaust port via the inlet port into a combustion chamber of the hydrogen combustion engine.

Due to the combination of the energy-efficient pyrolysis and/or plasmalysis process for the production of hydrogen with the hydrogen combustion engine with closed noble gas cycle, the process carried out by means of the hydrogen storage power plant is characterized by a low required energy input and high efficiency at the same time. The electrical energy used on the input side, for example for plasmalysis, is lower than the electrical energy generated, for example, by an electrical generator coupled to the hydrogen combustion engine.

In one possible embodiment of the process, it is provided that at least a portion of the hydrogen produced is diverted and not fed to the storage device. This portion can, for example, be a surplus that cannot be absorbed by the storage device. This part can then be methanized again using generally known processes and fed back into a gas network. This makes it possible to reduce the size of the storage device for the hydrogen. The methane produced from the diverted portion of the hydrogen can also be burned directly. This would then be $CO_2$-neutral, as the carbon dioxide again forms a raw material for methanation. However, the methane can also be recirculated so that, for example, an excess of electrical energy can be used with an existing infrastructure to decarbonize industrially captured carbon dioxide.

BRIEF DESCRIPTION OF THE DRAWINGS

Examples of embodiments of the invention are explained in more detail below with reference to drawings.

Corresponding parts are marked with the same reference signs in all figures.

DETAILED DESCRIPTION OF SPECIFIC EMBODIMENTS

Figure 1:
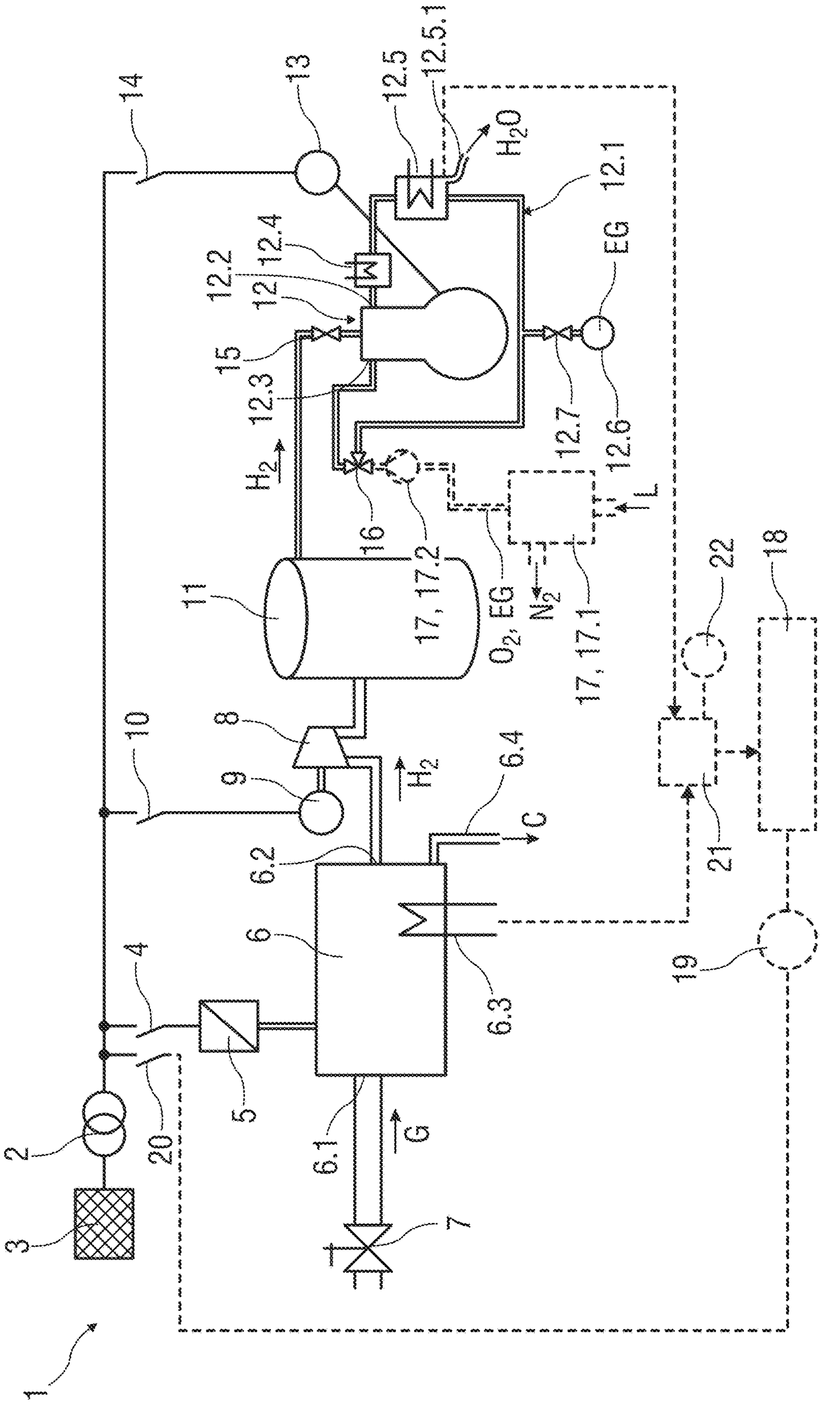
FIG. 1 is a schematic diagram of a hydrogen storage power plant.

FIG. 1 shows a circuit diagram of a possible embodiment of a hydrogen storage power plant 1.

The hydrogen storage power plant 1 comprises a voltage converter 2 for converting an electrical voltage of an electrical grid 3 into an operating voltage of the hydrogen storage power plant 1.

A converter 5, via which a plasmalysis device 6 is electrically supplied, can be electrically coupled to the voltage converter 2 via a switch 4.

The plasmalysis device 6 comprises a gas inlet 6.1, via which a gas G, in particular natural gas and/or methane, can be supplied to the plasmalysis device 6. A gas supply can be adjusted by means of a controllable valve 7.

Furthermore, the plasmalysis device 6 comprises a gas outlet 6.2, via which hydrogen $H_2$ can be discharged, a plasmalysis waste heat extraction point 6.3, for example in the form of a heat exchanger, and an outlet 6.4 for carbon C.

The gas outlet 6.2 is fluidically coupled to a compressor 8, which can be driven by a motor 9. The motor 9 can be electrically coupled to the voltage converter 2 via a further switch 10.

The compressor 8 is fluidically coupled on the output side to a storage device 11 for storing the hydrogen $H_2$.

The storage device 11 is coupled on the output side to a hydrogen combustion engine 12. The hydrogen combustion engine 12 has a closed noble gas cycle 12.1 for noble gas circulation, with the noble gas cycle 12.1 leading from an exhaust port 12.2 of the hydrogen combustion engine 12 via a circulation path to an inlet port 12.3 of the hydrogen combustion engine 12, and guides a noble gas EG leading from the exhaust port 12.2 via the inlet port 12.3 into a combustion chamber of the hydrogen combustion engine 12.

The hydrogen combustion engine 12 also includes a cooling circuit waste heat extraction point 12.4, an exhaust gas waste heat extraction point 12.5 with a water drain 12.5.1 and a storage tank 12.6 for the noble gas EG, which can be coupled to the noble gas cycle 12.1 via a valve 12.7.

An electric generator 13 is coupled to the hydrogen combustion engine 12 and is driven by the hydrogen combustion engine 12. The generator 13 can be electrically coupled to the voltage converter 2 by means of a further switch 14, so that electrical energy generated by the generator 13 can be fed into the electrical grid 3.

To obtain hydrogen $H_2$ from natural gas and/or methane, these are or this is supplied to the plasmalysis device 6. In one possible embodiment, the natural gas and/or methane are/is taken directly from a gas network without prior pressure reduction.

In this process, the methane is decomposed in a plasma in the absence of oxygen, according to $$CH_4(g) \rightleftharpoons C(f)+2\ H_2(g)$$

to produce hydrogen $H_2$ and elemental carbon C.

The carbon C is discharged via outlet 6.4 and the hydrogen $H_2$ is compressed by compressor 8 and stored in storage device 11. If the natural gas and/or methane have been broken down in the plasmalysis without prior pressure reduction, the effort for compressing the hydrogen $H_2$ may be reduced because of the higher pressure level, since the hydrogen $H_2$ is already at a higher pressure at the gas outlet 6.2.

In an alternative embodiment not shown here, the hydrogen $H_2$ can be produced in a methane pyrolysis and/or natural gas pyrolysis by means of a pyrolysis device.

If the stored hydrogen $H_2$ is to be combusted in the hydrogen combustion engine 12 for reconversion, the hydrogen $H_2$ is supplied to the hydrogen combustion engine 12 via a valve 15. The noble gas cycle 12.1 is a closed cycle, with argon in particular being used as the noble gas EG.

A combustion of hydrogen $H_2$ is realized without ambient air. For this purpose, oxygen O2 is supplied to the hydrogen combustion engine 12 via a valve 16.

In one possible embodiment, the hydrogen storage power plant 1 has an oxygen production unit 17 coupled to the valve 16, which is in particular a gas permeation device with a gas permeation membrane 17.1 and a conveying unit 17.2. The conveying unit 17.2 is used to draw air L into the gas permeation membrane 17.1, which separates the air L into nitrogen $N_2$, oxygen $O_2$ and the noble gas EG, in particular argon. This means that oxygen $O_2$ and the noble gas EG can be supplied to the inlet port 12.3 of the hydrogen combustion engine 12, and the storage container 12.6 can be reduced in size or omitted. In particular, to prevent the concentration of noble gas in the noble gas circuit 12.1 from rising above a specified limit, the circuit is regularly purged of excess noble gas EG.

During the combustion of hydrogen with operating gas circulation, water $H_2O$ is formed. This water $H_2O$ is condensed by a condenser, which is, for example, a component of an exhaust gas heat exchanger forming the exhaust gas heat extraction point 12.5, and separated from the noble gas EG used as the working gas, for example argon. As a result, only the noble gas EG is returned to the combustion chamber of the hydrogen combustion engine 1 via the circulation path.

The energy converted into motion in the hydrogen combustion engine 12 by combustion of hydrogen $H_2$ is transferred to the generator 13, which converts the kinetic energy into electrical energy and feeds it into the electrical grid 3.

In one possible design of the hydrogen storage power plant 1, waste heat generated during plasmalysis in the plasmalysis device 6 and waste heat generated during the combustion of hydrogen $H_2$ in the hydrogen combustion engine 12 can be utilized in a thermodynamic cycle 18. For this purpose, the plasmalysis waste heat extraction point 6.3 and the exhaust gas waste heat extraction point 12.5 can be coupled as a heat source to the thermodynamic cycle 18. The thermodynamic cycle 18 is designed, for example, as a steam process, an organic Rankine process or a supercritical $CO_2$ process.

A turbine (not shown in detail) of the cycle 18 is coupled in a known manner to an electric generator 19, which converts kinetic energy of the turbine into electrical energy. This electrical energy is supplied via another switch 20 to an electrical consumer of the hydrogen storage power plant 1 and/or fed into the electrical grid 3.

Since the plasmalysis and combustion processes of hydrogen $H_2$ take place at different times and generally not simultaneously, the plasmalysis waste heat extraction point 6.3 and the exhaust gas waste heat extraction point 12.5 can be coupled to the cycle 18 in a further possible design via a switching element 21, which, for example, forms a switch. In this case, the switching element 21 is designed in such a way that the coupling with the cycle 18 can be carried out separately and together for the plasmalysis waste heat extraction point 6.3 and the exhaust gas waste heat extraction point 12.5.

In order to be able to operate the cycle 18 even if, at least briefly, no or insufficient waste heat can be provided by plasmalysis and hydrogen combustion, a further possible design envisages that the switching element 21 is additionally coupled to a heat storage device 22 via a medium. Thus, excess waste heat from the plasmalysis and the hydrogen combustion can be stored and supplied to the cycle process 18 as needed, so that it can be operated without interruption.

Figure 2:
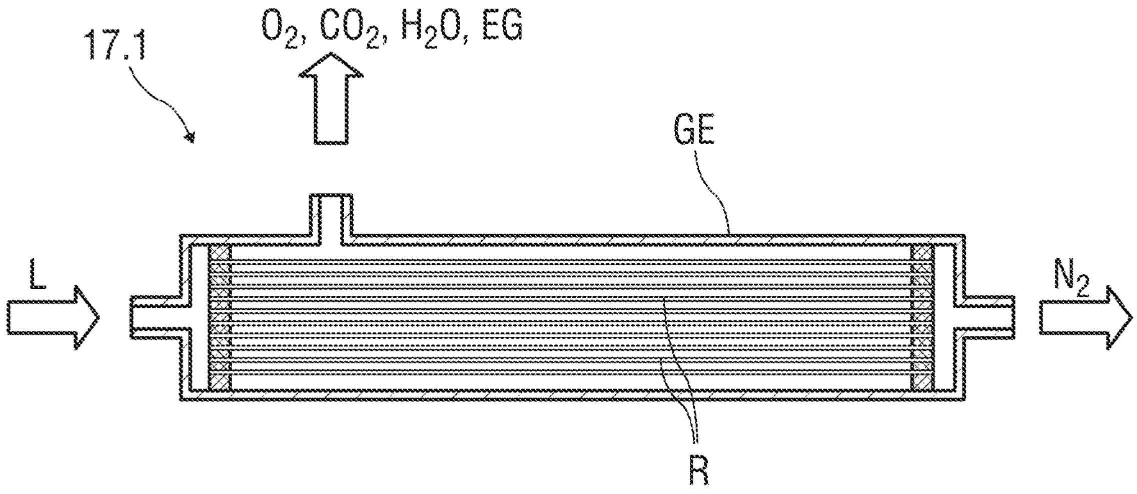
FIG. 2 schematically shows a gas permeation membrane.

FIG. 2 shows a possible embodiment of a gas permeation membrane 17.1. The gas permeation membrane 17.1 comprises a housing GE and a plurality of hollow tubes R and is designed to separate air L into two gas groups. One gas group comprises nitrogen $N_2$ and the other gas group comprises oxygen O2, carbon dioxide $CO_2$, water $H_2O$ and noble gases EG.

Figure 3:
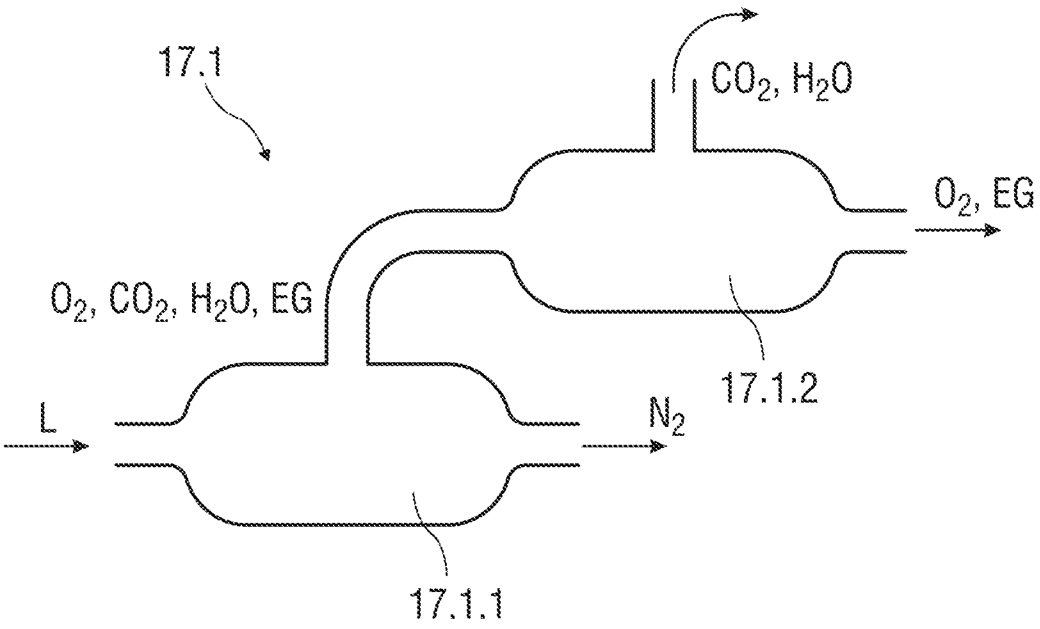
FIG. 3 schematically shows a cascaded gas permeation membrane.

Another possible embodiment of a gas permeation membrane 17.1 is shown in FIG. 3. The gas permeation membrane 17.1 is designed for cascaded gas permeation and has two gas permeation membranes 17.1.1, 17.1.2.

In this process, a first gas permeation membrane 17.1.1, whose function corresponds to the gas permeation membrane 17.1 shown in FIG. 2, is followed by a further gas permeation membrane 17.1.2, which in turn separates the gas group comprising oxygen $O_2$, carbon dioxide $CO_2$, water $H_2O$ and noble gases EG into two gas groups. One gas group includes carbon dioxide $CO_2$ and water $H_2O$, and another gas group includes oxygen $O_2$ and the noble gas EG argon. This makes it possible to supply an at least almost pure gas mixture of oxygen $O_2$ and argon to the hydrogen combustion engine 12.

LIST OF REFERENCES

1 Hydrogen storage power plant
2 Voltage converter
3 Electrical grid
4 Switch
5 Converter
6 Plasmalysis device
6.1 Gas inlet
6.2 Gas outlet
6.3 Plasmalysis waste heat extraction point
6.4 Outlet
7 Valve
8 Compressor
9 Motor
10 Switch
11 Storage device
12 Hydrogen combustion engine
12.1 Noble gas cycle
12.2 Exhaust port
12.3 Inlet port
12.4 Cooling circuit waste heat extraction point
12.5 Exhaust gas waste heat extraction point
12.5.1 Water drain
12.6 Storage tank
12.7 Valve
13 Generator
14 Switch
15 Valve
16 Valve
17 Oxygen generation unit
17.1 Gas permeation membrane
17.1.1 Gas permeation membrane
17.1.2 Gas permeation membrane
17.2 Conveying unit
18 Cycle
19 Generator
20 Switch
21 Switching element
22 Heat storage device
C Carbon
$CO_2$ Carbon dioxide
EG Noble gas
G Gas
GE Housing
$H_2$ Hydrogen
$H_2O$ Water
L Air
$N_2$ Nitrogen
$O_2$ Oxygen
R Tube

What is claimed is:

1. A hydrogen storage power plant, comprising:

at least one of a pyrolysis device and a plasmalysis device, for producing hydrogen from methane or natural gas;

a storage device for storing the hydrogen, coupled on an output side to the pyrolysis device or coupled on an output side to the plasmalysis device;

a hydrogen combustion engine coupled on the output side to the storage with a closed noble gas cycle for noble gas circulation, which leads from an exhaust port of the hydrogen combustion engine via a circulation path to an inlet port of the hydrogen combustion engine and guides a noble gas from the exhaust port via the inlet port into a combustion chamber of the hydrogen combustion engine; and having at least one of a plasmalysis waste heat extraction point for extracting waste heat arising during methane plasmalysis and/or natural gas plasmalysis, a cooling circuit waste heat extraction point for extracting waste heat from a cooling circuit, which is generated during the combustion of hydrogen and transferred to a cooling circuit of the hydrogen combustion engine, and an exhaust gas waste heat extraction point for extracting waste heat generated during the combustion of hydrogen and transferred to an exhaust gas of the hydrogen combustion engine from the exhaust gas;

wherein a switch is coupled to the plasmalysis waste heat extraction point, the exhaust gas waste heat extraction point and a thermodynamic cycle via a medium, and the switch is designed to couple the plasmalysis waste heat extraction point and the exhaust gas waste heat extraction point separately and together with the thermodynamic cycle via the medium.

2. The hydrogen storage plant according to claim 1, wherein the noble gas is argon.

3. The hydrogen storage plant according to claim 1, comprising an oxygen generation unit whose outlet is coupled to the inlet port of the hydrogen combustion engine.

4. The hydrogen storage plant according to claim 3, wherein the oxygen generation unit is a gas permeation device which is designed to separate a gas mixture, at least into oxygen and nitrogen.

5. The hydrogen storage plant according to claim 4, wherein the gas permeation device is configured for a cascaded separation of the gas mixture and separates nitrogen, oxygen and argon from the gas mixture.

6. The hydrogen storage power plant according to claim 4, wherein the gas mixture is air.

7. The hydrogen storage plant according to claim 1, wherein the pyrolysis device is designed in such a way that methane or natural gas is pyrolyzed without pressure reduction, or the plasmalysis device is designed in such a way that methane or natural gas is pyrolyzed without pressure reduction.

8. The hydrogen storage plant according to claim 1, wherein at least one of the plasmalysis waste heat extraction point and the exhaust gas waste heat extraction point is coupled as a heat source to a thermodynamic cycle, and the thermodynamic cycle is coupled to a generator for the generation of electrical energy.

9. The hydrogen storage plant according to claim 8, wherein the switch is additionally coupled to a heat storage device via the medium, the switch is designed to couple the plasmalysis waste heat extraction point and the exhaust gas waste heat extraction point separately and together with the heat storage device via the medium, and the switch is designed to couple the heat storage device to the thermodynamic cycle via the medium.

10. The hydrogen storage plant according to claim 1, wherein the switch is additionally coupled to a heat storage device via the medium, the switch is designed to couple the plasmalysis waste heat extraction point and the exhaust gas waste heat extraction point separately and together with the heat storage device via the medium, and the switch is designed to couple the heat storage device to the thermodynamic cycle via the medium.

11. A method for operating the hydrogen storage power plant according to claim 1, wherein at least one of a methane pyrolysis and a natural gas pyrolysis and a methane plasmalysis and a natural gas plasmalysis is carried out to produce hydrogen from methane or natural gas, the hydrogen produced is stored, and the stored hydrogen is combusted in the hydrogen combustion engine with the closed noble gas cycle for the noble gas circulation, which leads from the exhaust port of the hydrogen combustion engine via the circulation path to the inlet port of the hydrogen combustion engine and the noble gas is conducted from the exhaust port via the inlet port into the combustion chamber of the hydrogen combustion engine.

* * * * *